United States Patent

Wixey

Patent Number: 5,186,088
Date of Patent: Feb. 16, 1993

[54] WOOD LATHE WITH SLIDING, HORIZONTALLY-ROTATABLE HEADSTOCK AND VARIABLE SPEED DRIVE

[75] Inventor: Barry D. Wixey, Pittsburgh, Pa.

[73] Assignee: Delta International Machinery Corp., Pittsburgh, Pa.

[21] Appl. No.: 739,671

[22] Filed: Aug. 6, 1991

[51] Int. Cl.⁵ .......................... B27C 7/02; B23B 19/00
[52] U.S. Cl. .................................. 82/142; 82/146; 142/1; 474/40
[58] Field of Search ............... 142/1; 82/117, 142, 82/143, 146, 149, 152; 474/37, 40, 42

[56] References Cited

U.S. PATENT DOCUMENTS

| | | |
|---|---|---|
| 680,167 | 8/1901 | Nitterauer . |
| 1,506,154 | 8/1924 | Bertelson et al. . |
| 1,990,036 | 2/1935 | Kratz et al. . |
| 2,089,363 | 8/1937 | Haas ................... 82/142 X |
| 2,173,769 | 9/1939 | Small . |
| 2,382,608 | 8/1945 | Connell ............... 82/142 X |
| 2,470,871 | 5/1949 | Schwantes et al. . |
| 2,486,524 | 11/1949 | Dulaney . |
| 2,619,842 | 12/1952 | Felix . |
| 2,792,858 | 5/1957 | Bryant . |
| 2,797,590 | 7/1957 | Reeves .................. 474/40 X |
| 2,800,154 | 7/1957 | Ellis . |
| 2,885,897 | 5/1959 | Pettigrew . |
| 2,887,695 | 5/1959 | Charlat . |
| 3,154,959 | 11/1964 | Palm ..................... 474/37 |
| 3,195,413 | 7/1965 | Muller . |
| 3,232,171 | 2/1966 | Hengehold . |
| 3,418,863 | 12/1968 | Landau ................. 474/40 |
| 3,608,386 | 9/1971 | Pambid et al. ......... 474/37 |
| 3,690,687 | 9/1972 | Moe . |
| 3,718,405 | 2/1973 | Keiter et al. . |
| 3,908,492 | 9/1975 | Roskelley . |
| 4,512,380 | 4/1985 | Schmidt . |
| 4,597,144 | 7/1986 | Frank et al. . |
| 4,638,550 | 1/1987 | Malzkorn . |
| 4,738,171 | 4/1988 | Link et al. . |
| 4,840,095 | 6/1989 | Nusbaumer . |

OTHER PUBLICATIONS

*Woodturning: A Designer's Notebook*, by Raykey (New York: Sterling Publishing, 1987), pp. 23-25.

*Primary Examiner*—Steven C. Bishop
*Attorney, Agent, or Firm*—Merchant, Gould, Smith, Edell, Welter & Schmidt

[57] ABSTRACT

Disclosed is a system for forming a variable speed pulley, a variable speed drive system, a variable speed lathe, a lathe having a slidable, horizontally-rotatable headstock, and a variable speed lathe having a slidable, horizontally-rotatable headstock.

10 Claims, 9 Drawing Sheets

WOOD LATHE WITH SLIDING, HORIZONTALLY-ROTATABLE HEADSTOCK AND VARIABLE SPEED DRIVE

BACKGROUND AND SUMMARY OF THE INVENTION

The present application discloses a variable speed lathe having a sliding, horizontally-rotatable headstock. The present variable speed lathe is less complicated and expensive than typical prior art variable speed lathes which comprise typical prior art variable speed pulleys and/or typical prior art variable speed drive systems. Furthermore, in a preferred embodiment, one or more of the variable speed pulleys of the variable speed drive system within the lathe may comprise a conical face which extends substantially to the diameter of the central aperture. In such an embodiment, a greater range of speeds can be obtained for the same pulley size than can be obtained in typical prior art variable speed lathes which comprise typical prior art variable speed drive systems having variable speed pulleys in which the sheaves are positioned onto one or more sleeves and/or other hardware for supporting and interconnecting the sheaves.

The preferred lathe comprises a lathe bed and a headstock positioned on the lathe bed. The headstock comprises a variable speed system including two variable speed pulleys formed by sheaves, a driving shaft and a driven spindle shaft. Support means associated with the headstock operationally supports the two shafts in positions substantially parallel to one another. A V belt operationally connects the two pulleys.

Each variable speed pulley comprises two fixed sheaves, one on each shaft. Each fixed sheave comprises a conical face for forming one V belt bearing surface. The fixed sheaves further comprise means for securing the sheaves onto the driving or driven shaft so that the sheaves are prevented from both axial and rotational movement on the shafts. The means for securing each fixed sheave comprises a central aperture defined by a surface of the sheave. The central aperture has a diameter substantially corresponding to the diameter of the shaft so that the surface of the sheave which defines the central aperture is configured to be in direct contact with the shaft when the sheave is positioned on the shaft. The fixed sheave on the driving shaft and the fixed sheave on the driven shaft are positioned so that a tracking plane of the V belt is established to be substantially perpendicular to the axis of each shaft.

Each variable speed pulley also comprises first and second moveable sheaves, one on each shaft. Each moveable sheave comprises a conical face for forming one V belt bearing surface. The moveable sheaves further comprise means for securing the sheaves onto the driving or driven shaft so that the sheaves may move in the axial direction while being prevented from rotational movement on the shaft. The means for securing each moveable sheave comprises a central aperture defined by a surface of the sheave, the central aperture having a diameter substantially corresponding to the diameter of the shaft so that the surface of the sheave which defines the central aperture is configured to be in slidable direct contact with the shaft when the sheave is positioned on the shaft.

The present lathe further comprises control means for controlling the position of each moveable sheave so that the speed of the lathe spindle shaft can be controlled.

The preferred lathe comprises a slidable, horizontally-rotatable headstock. The lathe comprises a lathe bed having a length along a longitudinal axis. The lathe bed comprises rails oriented parallel to the longitudinal axis. The rails define a horizontal plane. The lathe bed has a side in front of which a user normally stands.

A headstock is located on the lathe bed rails. The headstock comprises a spindle shaft having a stock turning end for providing rotational movement to stock to be turned on the lathe. The spindle shaft has a length along a central axis. The central axis of the spindle shaft is located a predetermined distance above the rails. The headstock further comprises an adjustment mechanism for selectively adjusting the orientation of the spindle shaft axis in at least two orientations including parallel to the longitudinal axis of the lathe bed or perpendicular to the longitudinal axis of the lathe bed. The spindle shaft axis in each orientation is parallel to the horizontal plane defined by the rails.

The adjustment mechanism further comprises means for slidably locating the headstock along the length of the lathe bed so that, when the headstock is oriented in the second orientation with the stock turning end of the spindle shaft turned toward the front side of the lathe bed, stock which is too large in diameter to be turned between the central axis of the spindle shaft and the rails can be turned on the front side of the lathe bed with the headstock located substantially in the center of the bed in order to achieve maximum stability of the lathe while turning.

In its preferred form, the headstock comprises a surface which rests on the rails, and the surface which rests on the rails defines first and second mutually perpendicular slots formed in the bottom of the base. The lathe bed comprises a clamp key which fits between the rails and into the first and second slots. The clamp key comprises means for securing the headstock to the rails so that the spindle shaft can be oriented in either of the two mutually perpendicular orientations anywhere along the length of the lathe bed.

BRIEF DESCRIPTION OF THE DRAWINGS

FIG. 7 illustrates a preferred operational configuration of the present sliding, horizontally-rotatable headstock wood lathe. The figure illustrates the headstock positioned so that the spindle shaft is oriented in a direction which is perpendicular to the longitudinal axis of the lathe bed. The figure also shows a bowl which is being turned but which is too large in diameter to be turned between the central axis of the spindle shaft and the rails. The bowl is being turned on the front side of the lathe with the headstock slid to substantially the center of the lathe bed in order to achieve maximum stability of the lathe while turning.

DETAILED DESCRIPTION OF THE PREFERRED EMBODIMENTS

As was previously indicated, the present application discloses a variable speed lathe, a lathe having a slidable, horizontally-rotatable headstock, and a variable speed lathe having a slidable, horizontally-rotatable headstock.

Figure 1:
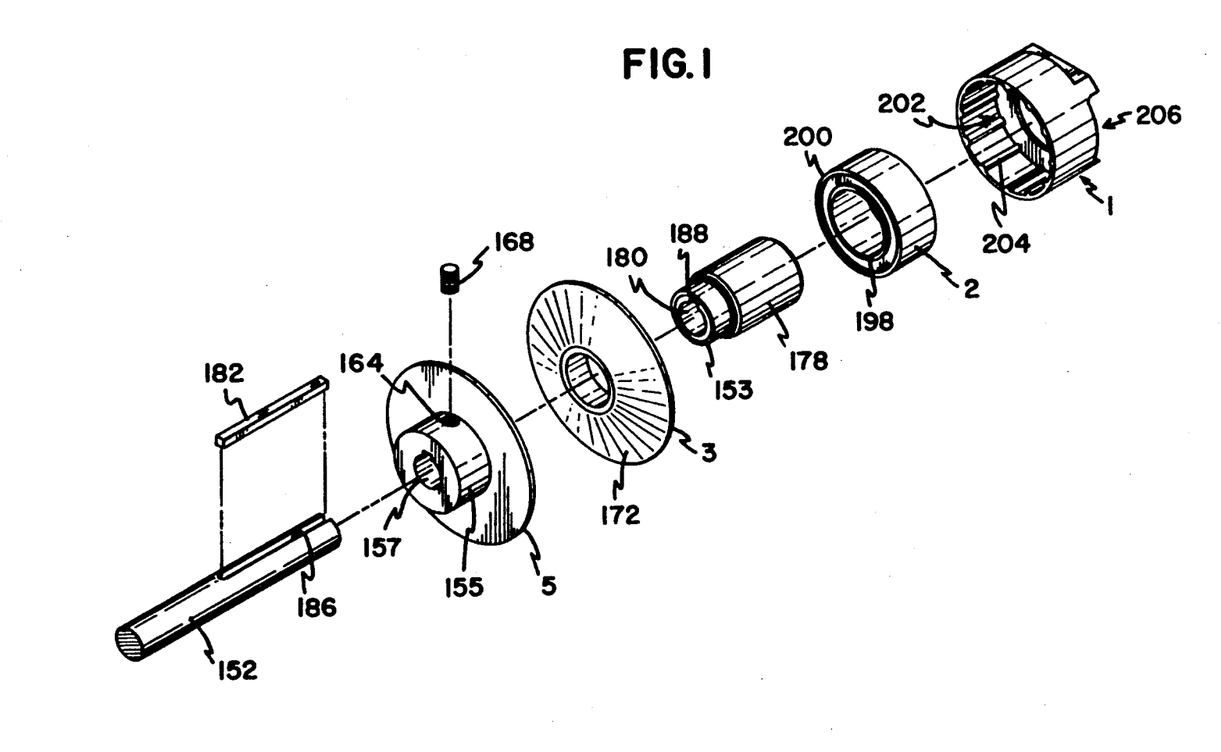
FIGS. 1 and 2 illustrate preferred embodiments of a variable speed pulley.
Figure 2:
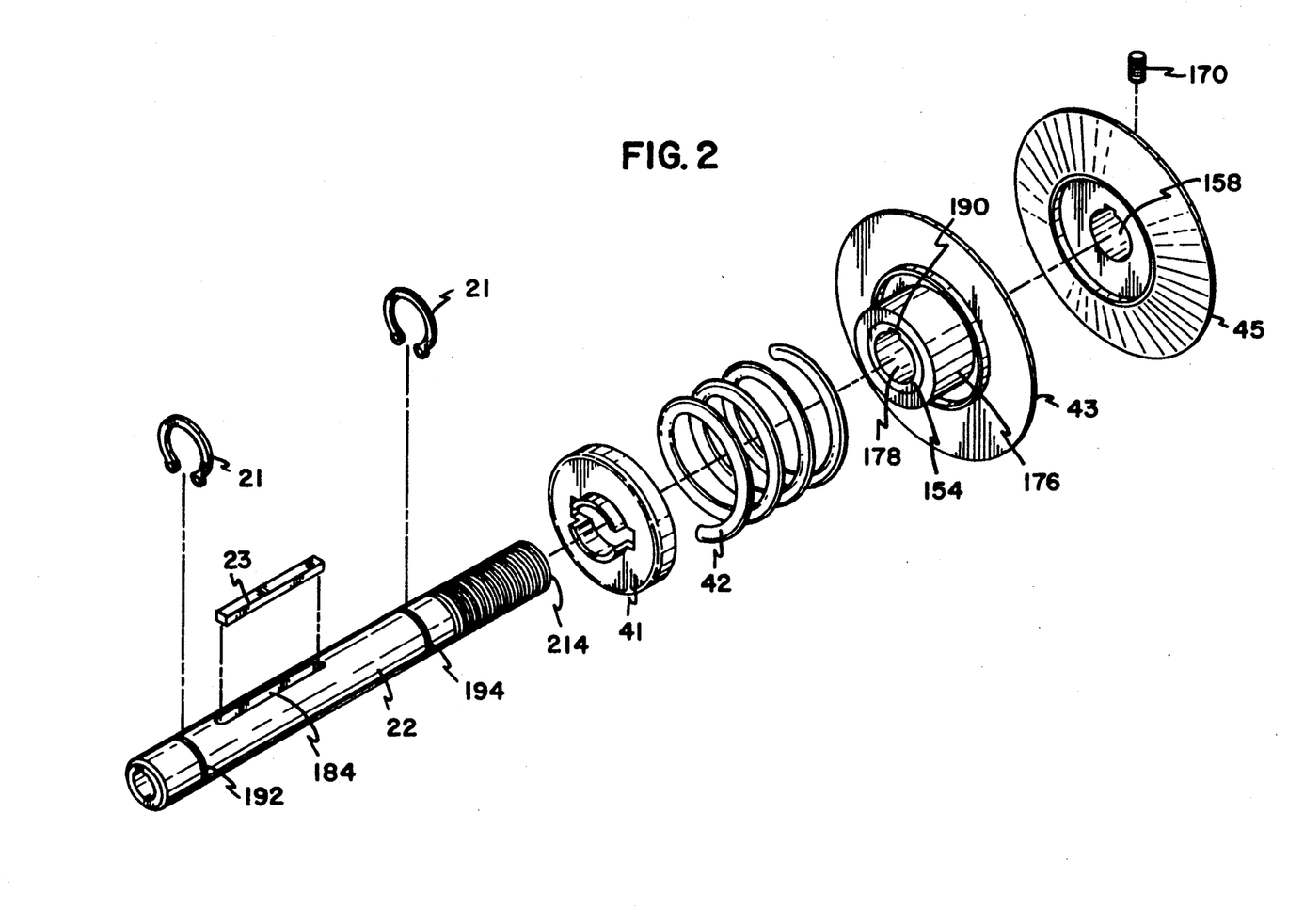

Preferred embodiments of variable speed pulleys compatible with the lathe are illustrated in FIGS. 1 and 2. Two fixed sheaves each comprise a conical face 160 (FIG. 3) or 162 (FIG. 4) forming one V belt bearing surface of the pulley. A hub such as 155 or 156 may be integrally formed with each fixed sheave. Each fixed sheave further comprises a central aperture such as 157 or 158 defined by a surface of the fixed sheave, the central aperture having a diameter substantially corresponding to the diameter of the driving shaft such as 152 or the driven shaft such as 22 so that the surface of the sheave which defines the central aperture is configured to be in direct contact with the shaft when the sheave is positioned on the shaft. Each fixed sheave such as 5 or 45 may further comprise a radially oriented threaded aperture such as 164 or 166 extending through the hub thickness of the fixed sheave and a set screw such as 168 or 170, the set screw having a thread matching the thread of the radially oriented threaded aperture.

Two moveable sheaves each also comprise a conical face 172, on moveable sheave 3, or conical face 174, on moveable sheave 43. Each moveable sheave may comprise a hub 176 integrally formed with the moveable sheave (as illustrated for moveable sheave 43) or the hub for the moveable sheave may comprise a press fit hub such as 178 which can be press fitted into the moveable sheave (as in the case of moveable sheave 3). Each moveable sheave comprises a central aperture defined by a surface of the moveable sheave or the moveable sheave and hub, such as aperture 178 of moveable sheave 43 and aperture 180 shown in the hub of moveable sheave 3. The central aperture of each moveable sheave has a diameter substantially corresponding to the diameter of the shaft (such as shaft 152 in the case of moveable sheave 3 and shaft 22 in the case of moveable sheave 43) so that the surface of the sheave which defines the central aperture is configured to be in slidable direct contact with the shaft when the sheave is positioned on the shaft.

In the preferred embodiment shown, each moveable sheave comprises a key such as key 23 in the case of moveable sheave 43 and key 182 in the case of moveable sheave 3. Each key is compatible with a keyway in the corresponding shaft. For example, key 23 is compatible with keyway 184 in shaft 22 and key 182 is compatible with keyway 186 in shaft 152.

In the preferred embodiment shown, the surface of each moveable sheave which defines the aperture further defines a keyway such as keyway 188 of moveable sheave 3 and keyway 190 of moveable sheave 43. Each keyway in such a preferred moveable sheave has a cross-sectional size configured for a slidable fit with its corresponding key.

As can be seen from the figures, the preferred moveable sheaves in the present system comprise a sleeve bearing such as sleeve bearing 153 in the case of moveable sheave 3 and sleeve bearing 154 in the case of moveable sheave 43. In each instance, the sleeve bearing has an internal diameter sized for a nominal slip fit directly onto the shaft and, in the preferred embodiments shown, defines a keyway which has a cross-sectional size configured for a slidable fit with the corresponding key.

As has also been previously mentioned, the moveable sheave may have a conical face such as conical face 172 of moveable sheave 3 which extends substantially to the diameter of the central aperture of the sheave.

Figure 3:
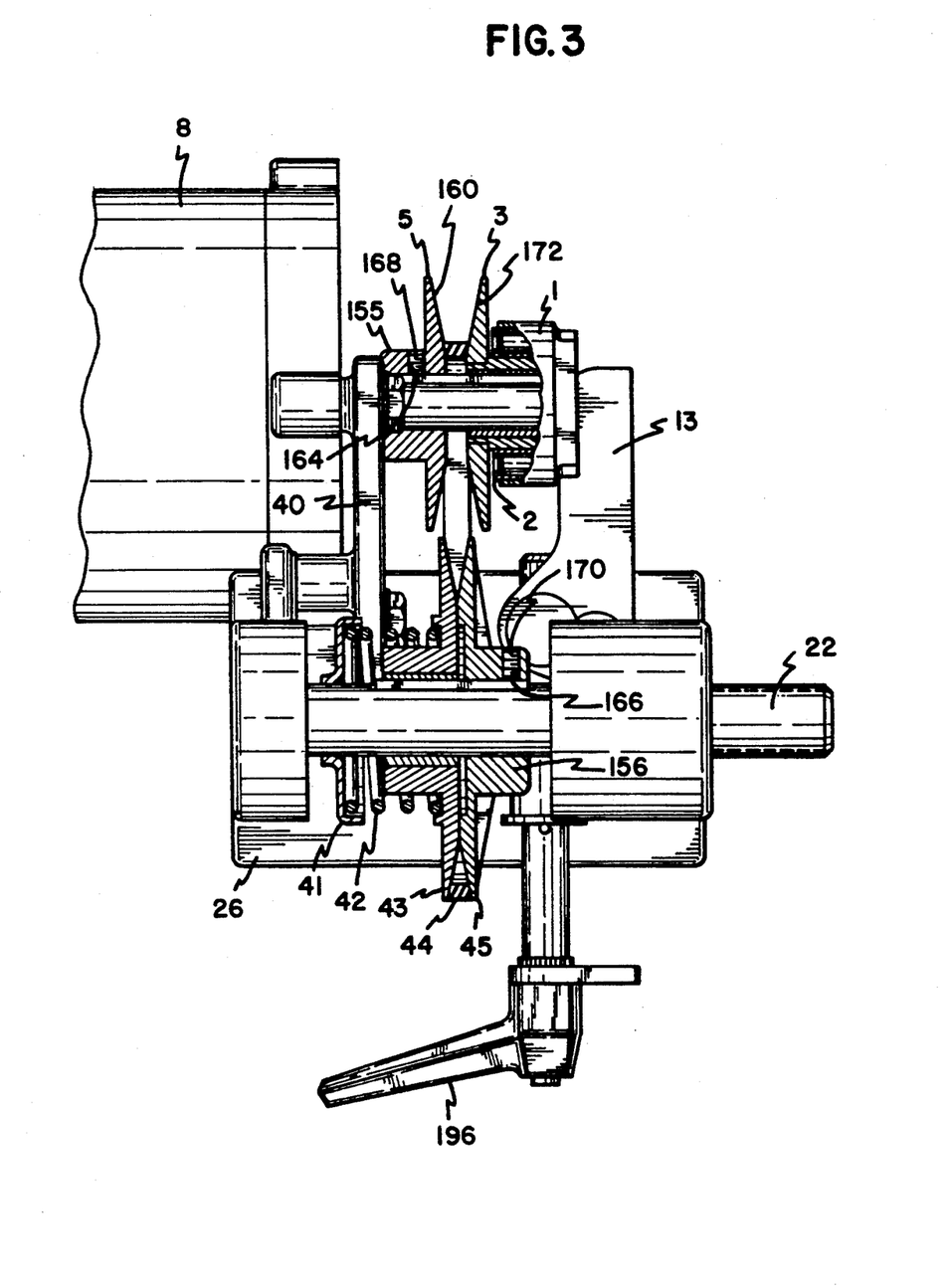
FIGS. 3, 4 and 5 illustrate a preferred variable speed drive system.
Figure 4:
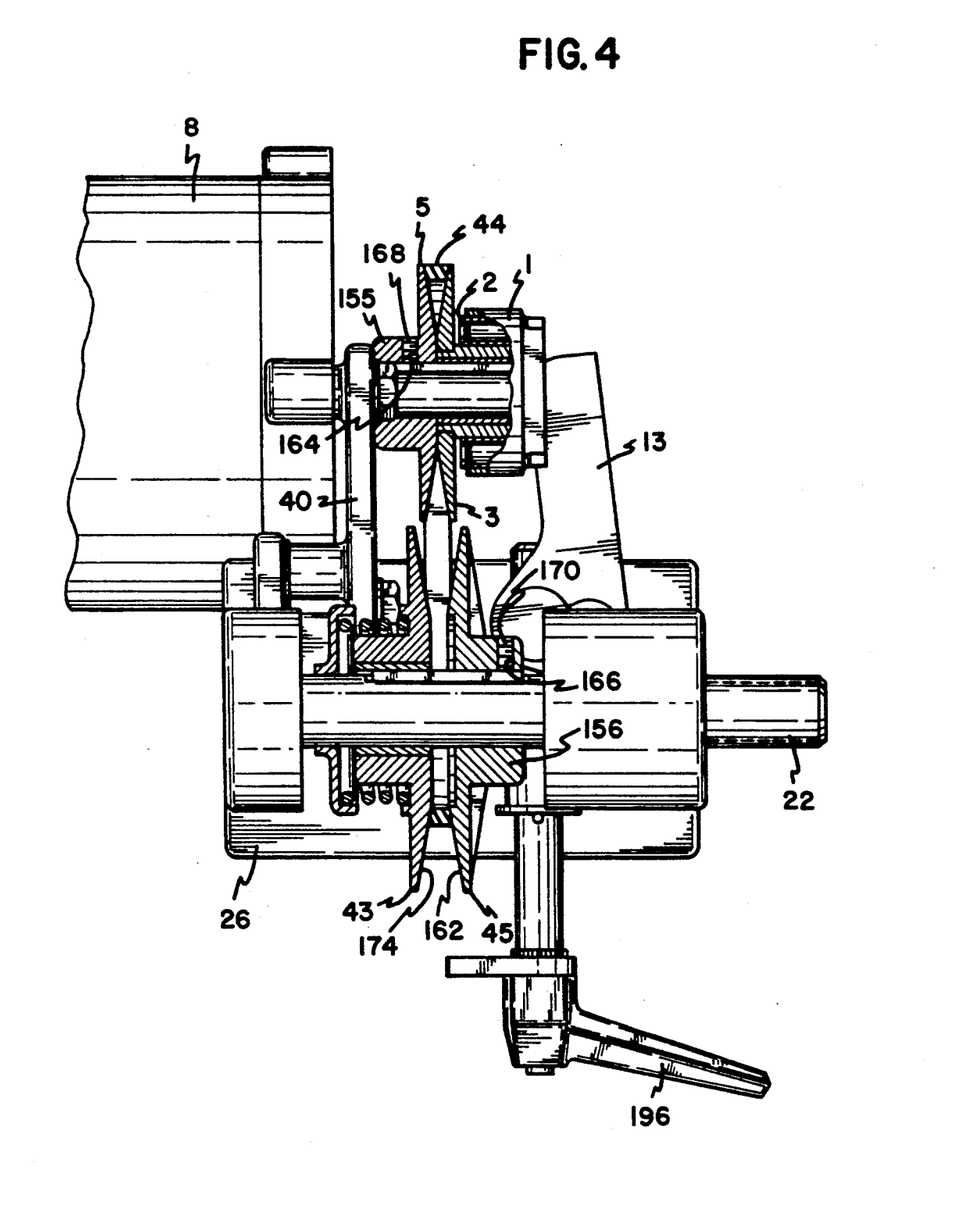
Figure 5:
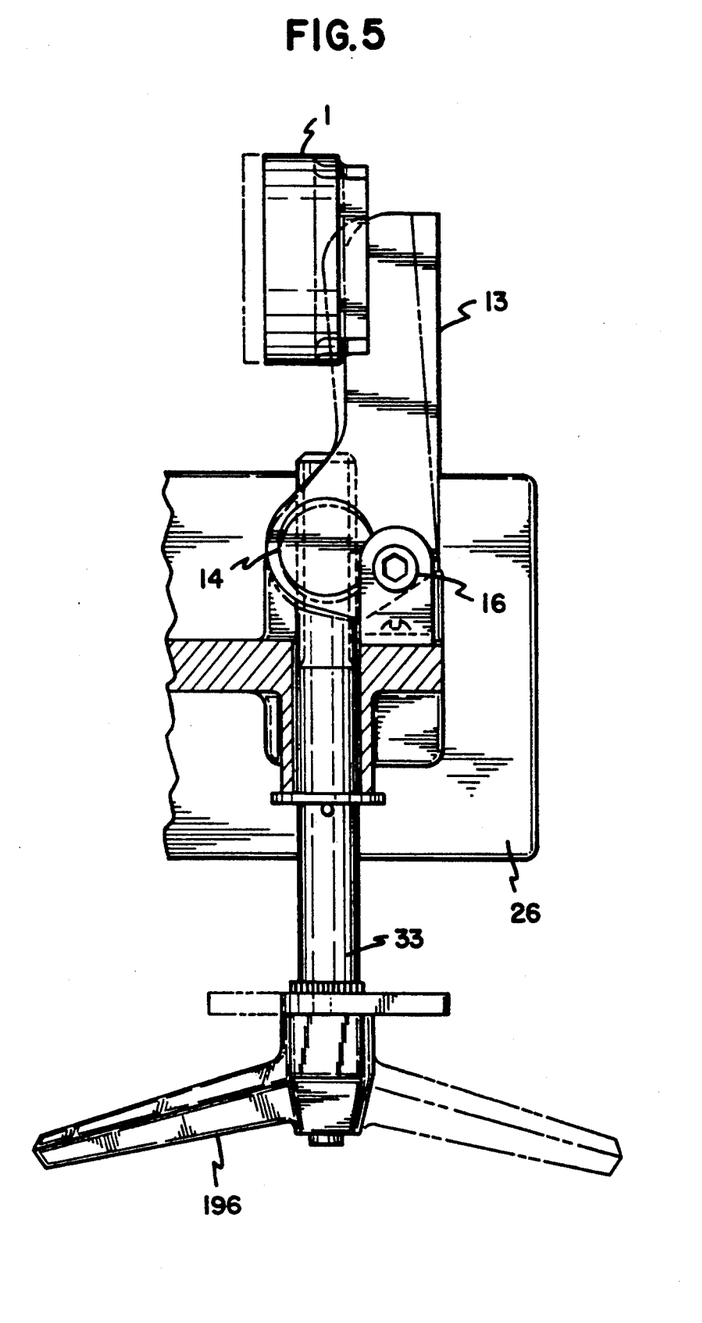

The preferred variable speed drive system for the variable speed further comprises two fixed sheaves such as sheaves 5 and 45, one on each shaft, fixed sheave 5 in the present system being mounted onto driving shaft 152, and fixed sheave 45 in the present system being mounted on driven shaft 22. Each fixed sheave comprises a conical face such as conical face 160 on sheave 5 and conical face 162 on sheave 45, the conical face on each fixed sheave forming one V belt bearing surface. The fixed sheaves in the present variable speed drive further comprise means for securing the sheaves onto the driving or driven shaft so that the sheaves are prevented from both axial and rotational movement on the shafts. The means for securing each sheave comprises a central aperture such as central aperture 157 in fixed sheave 5 and central aperture 158 in fixed sheave 45, each central aperture being defined by a surface of the respective sheave. The central aperture of each fixed sheave has a diameter substantially corresponding to the diameter of its corresponding shaft so that the surface of the sheave which defines the central aperture is configured to be in direct contact with the shaft when the sheave is positioned on the shaft. Fixed sheave 5 on driving shaft 152 and fixed sheave 45 on driven shaft 22 are positioned so that a tracking plane of V belt 44 is established to be substantially perpendicular to the axis of each shaft.

The present variable speed drive system further comprises first and second moveable sheaves such as sheaves 3 and 43, one sheave on each shaft. Each moveable sheave comprises a conical face such as conical face 172 of sheave 3 and conical face 174 of sheave 43, each conical face forming one V belt bearing surface. The moveable sheaves of the present variable speed drive system further comprise means for securing the sheaves onto the driving or driven shaft so that sheaves may move in the axial direction while being prevented from rotational movement on the shaft. In the preferred embodiment, the means for securing each moveable sheave comprises a central aperture such as aperture 180 of sheave 3 and aperture 178 of sheave 43, each central aperture being defined by a surface of the corresponding sheave. The central aperture of each moveable sheave has a diameter substantially corresponding to the diameter of its corresponding shaft so that the surface of the sheave which defines the central aperture is configured to be in slidable direct contrast with the shaft when the sheave is positioned on its corresponding shaft.

As will be further explained below, each moveable sheave in the present variable speed drive system comprises control means for controlling the position of the corresponding moveable sheave.

Each moveable sheave in the preferred embodiment comprises a sleeve bearing such as sleeve bearing 153 in sheave 3 and sleeve bearing 154 in sheave 43, each sleeve bearing being located in the center of its corresponding sleeve. The sleeve bearing in each moveable sheave has an internal diameter sized for a nominal slip fit when the sheave is placed onto its corresponding shaft.

Furthermore, the conical face on the moveable sheave may extend substantially to the diameter of the central aperture of the sheave, as is the case of conical surface 172 of sheave 3.

The means for securing the fixed and moveable sheaves in the present variable speed drive system can be the same as the means for securing the sheaves previously described for the present variable speed drive pulley.

Each moveable sheave in the present variable speed drive system comprises control means for controlling the position of the moveable sheave. In the case of moveable sheave 43, the control means comprises biasing means which may comprise a spring 42 for biasing the moveable sheave toward the fixed sheave. In the preferred embodiment shown, moveable sheave 43 is biased toward fixed sheave 45 via spring 42 which is compressed toward fixed sheave 45 by a spring cap 41 held in place by an external retaining ring 21 which fits into annular groove 192. Fixed sheave 45 is prevented from movement away from moveable sheave 43 by another external retaining ring 21 fitted into annular groove 194. The control means of the present variable speed drive system further comprises means for controlling the position of moveable sheave 3, the control means for moveable sheave 3 comprising adjustment means having a handle 196 controllable by a user for adjusting the position of moveable sheave 3.

In the preferred embodiment shown, the control means for controlling the position of moveable sheave 3 comprises hub means for forming a hub 178 with moveable sheave 3 and a bearing 2 having an inner race 198 and an outer race 200. Inner race 198 has an inside diameter sized for a press fit onto the outside diameter of hub 178, the inner race 198 of bearing 2 being fitted onto hub 178 of sheave 3.

The control means for controlling the position of moveable sheave 3 further comprises a bearing cap 1 comprising a central cavity 202 defined by an internal surface of cap 1. Central cavity 202 has one or more surfaces such as surfaces 204 located at a diameter sized for a press fit onto outer race 200 of bearing 2, bearing cap 1 being fitted onto the outer race of bearing 2. The preferred embodiment of bearing cap 1 further comprises means comprising a slot 206 for engaging a lever 13 of the adjustment means.

The preferred embodiment of the adjustment means comprises lever 13, one end of which fits into slot 206, lever 13 pivoting on a shaft 16 which may comprise a rivet engaging headstock frame 26. As previously indicated, one end of lever 13 engages slot 206 of bearing cap 1. The adjustment means further comprises a rotatable handle 196 for pivoting lever 13 and, accordingly, adjusting the axial position of moveable sheave 3 when handle 196 is rotated. In the embodiment shown, handle 196 is coupled to speed changer shaft 33, the outbound end of which comprises in the preferred embodiment a ⅜-8 inch Acme thread which passes through pivot nut 14. Pivot nut 14 is rotatably mounted in an aperture of lever 13 so that, when speed changer shaft 33 is rotated by handle 196, the outbound end of lever 13 moves in and out in contact with slot 206 of cap 1 in order to adjust the position of variable speed sheave 3.

In the preferred embodiment, sheaves 3 and 5 have a nominal outside diameter of approximately 3 inches, and sheaves 43 and 45 have a nominal outside diameter of approximately 5 inches. In the embodiment shown, when the adjustment means is adjusted as shown in FIG. 3, V belt 44 is tracking at the smallest diameter of the driving pulley and the largest diameter of the driven pulley, resulting in the slowest speed available in the preferred embodiment, approximately 500 rpm when a 1750 rpm motor 8 is used. When the adjustment means is adjusted so that the system is in the configuration shown in FIG. 4, V belt 44 is riding on the outermost position of the driving pulley and the innermost position of the driven pulley, resulting in the fastest speed available from the preferred embodiment, approximately 2,000 rpm when driven by 1750 rpm motor 8.

Although the preferred embodiment of the present system is shown with moveable sheave 43 biased toward the fixed sleeve on the driven shaft, those skilled in the art will recognize that alternate embodiments could comprise the biased sheave riding on the driving shaft and with the adjustment means operable by the user controlling the position of a moveable sheave on the driven shaft.

Figure 6:
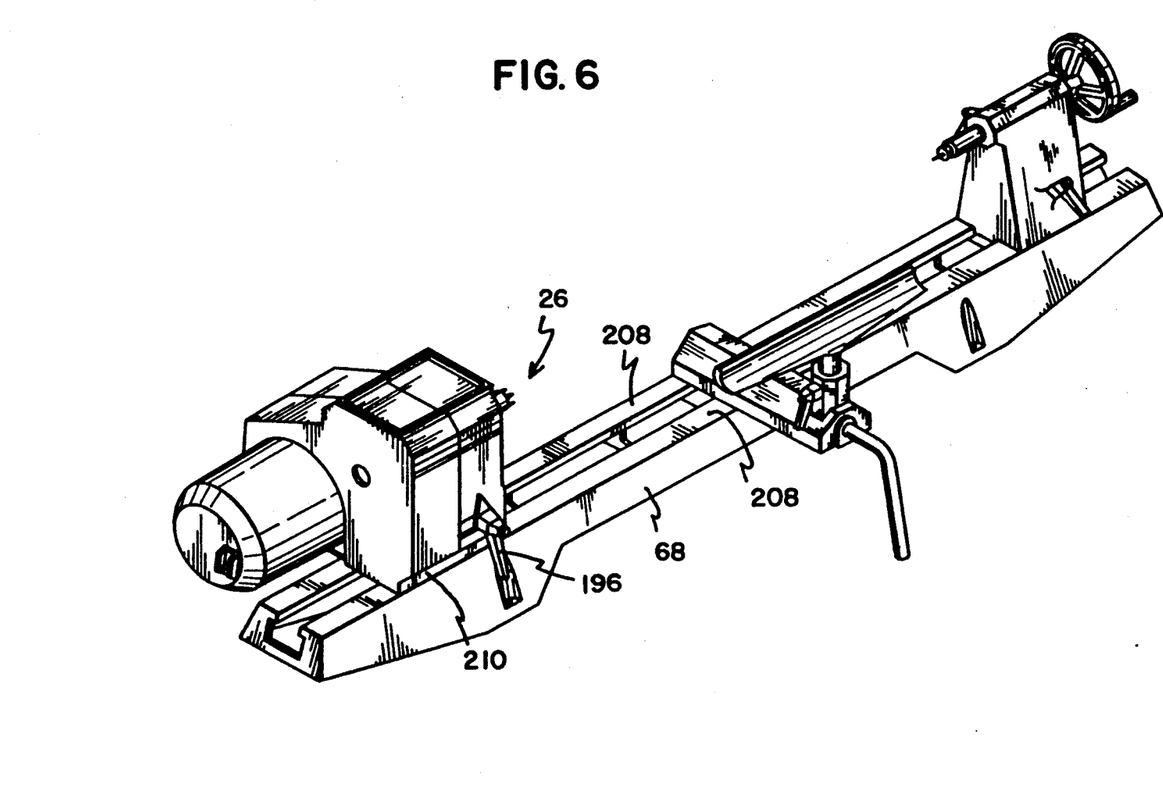
FIG. 6 illustrates a perspective view of the preferred embodiment of a wood lathe with a sliding, horizontally-rotatable headstock with the headstock aligned so that the spindle shaft axis is parallel to the longitudinal axis of the lathe bed.
Figure 7:
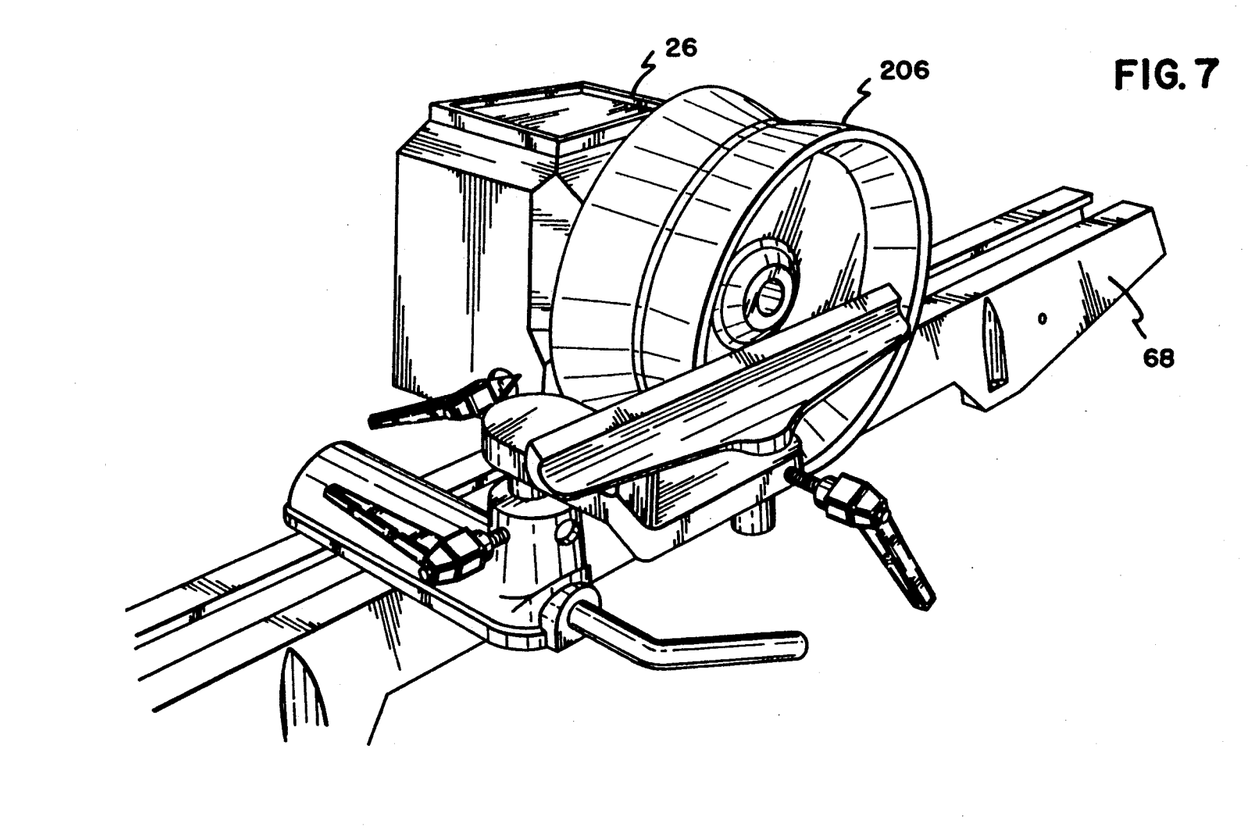

The present lathe preferably comprises a slidable, horizontally-rotatable headstock. Such a lathe comprises a lathe bed 68 having a length along a longitudinal axis, the lathe bed comprising rails 208 oriented parallel to the longitudinal axis. Rails 208 define a horizontal plane. Lathe bed 68 has a side 212 in front of which a user normally stands.

A head stock 26 is located on lathe bed rails 208. Headstock 26 comprises a spindle shaft 22 having a stock turning end 214 which is typically threaded for receipt of accessories such as face plates or bowl turning chucks or plates (not shown), the stock turning end 214 of the spindle shaft therefore being used to provide rotational movement to stock to be turned on the lathe. Spindle shaft 22 has a length along a central axis which is located a predetermined distance above rails 208.

Figure 8:
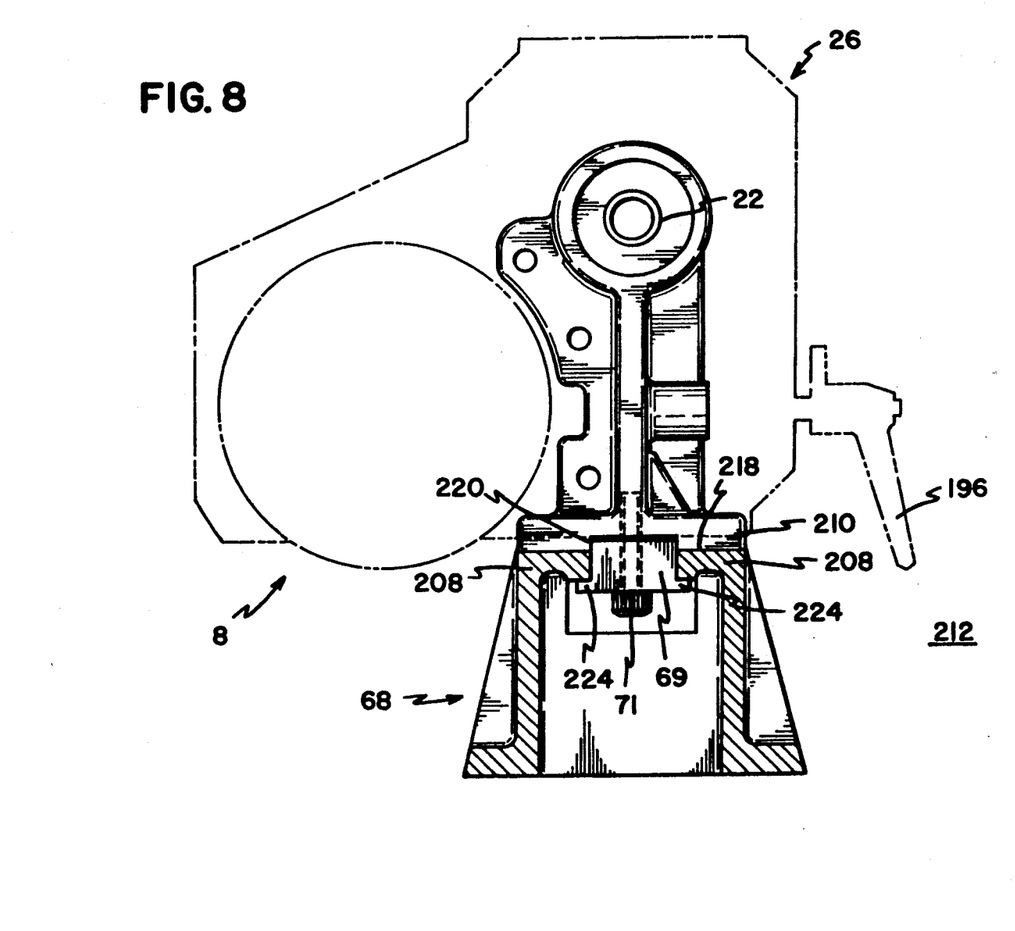
FIG. 8 illustrates preferred hardware for positioning the headstock on the lathe bed so that the orientation of the spindle shaft is parallel to the longitudinal axis of the bed, consistent with the position of the headstock shown in FIG. 6.
Figure 9:
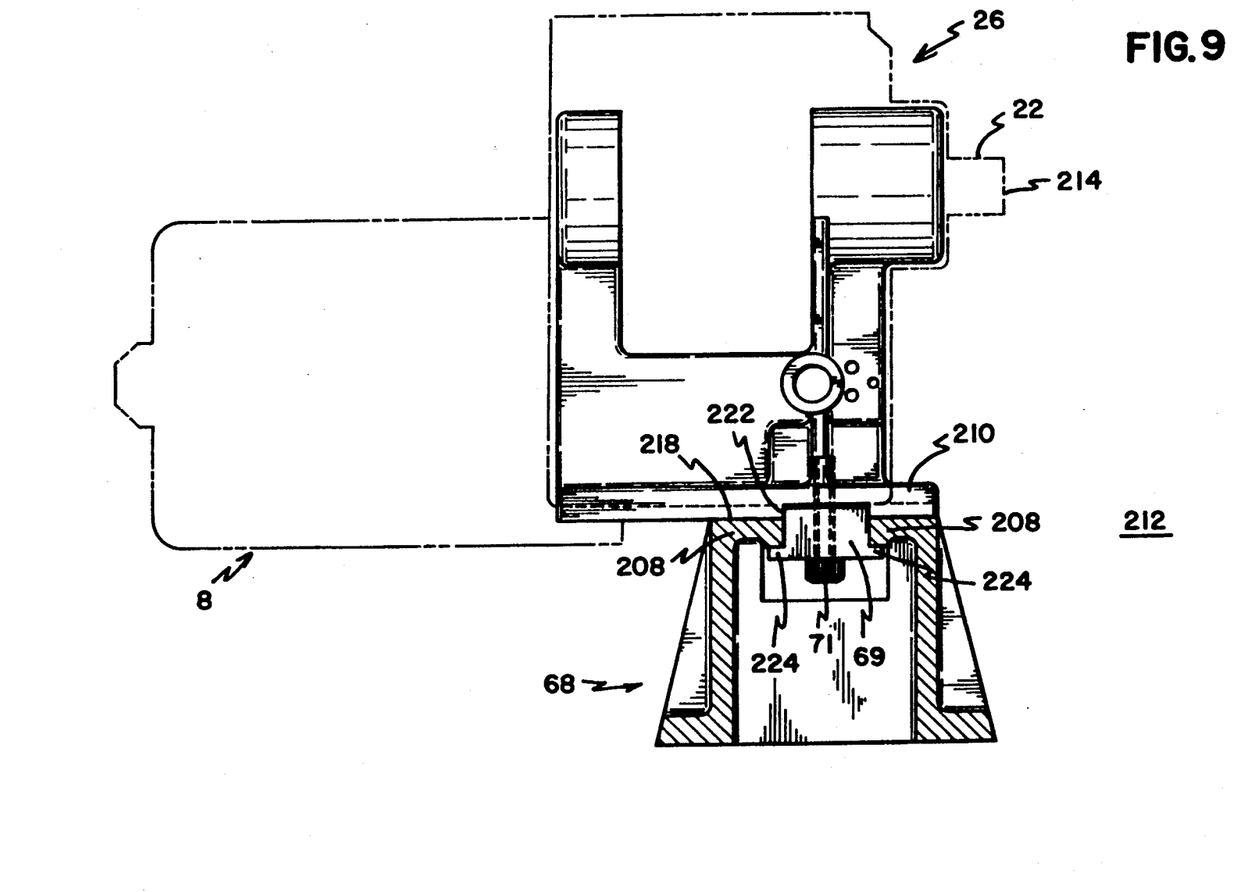
FIG. 9 illustrates preferred hardware for positioning the headstock so that the spindle shaft is oriented perpendicular to the longitudinal axis of the lathe bed, the preferred hardware comprising means for slidably locating the headstock along the length of the lathe bed, as is illustrated in the preferred bowl turning orientation of FIG. 7.

The present slidable, horizontally-rotatable headstock lathe further comprises adjustment means for selectively adjusting the orientation of the spindle shaft axis in at least two orientations including parallel to the longitudinal axis of the lathe bed as shown in FIG. 8 or perpendicular to the longitudinal axis of the lathe bed as shown in FIG. 9. The spindle shaft axis in each orientation is parallel to the horizontal plane defined by bed rails 208. The adjustment means further comprises means for slidably locating headstock 26 along the length of lathe bed 68 so that, when headstock 26 is oriented in the second orientation as shown in FIG. 9 with the stock turning end 214 of the spindle shaft turned toward front side 212 of the lathe bed, stock such as 206 (FIG. 7) which is too large in diameter to be turned between the central axis of the spindle shaft and rails 208 can be turned on the front side 212 of lathe bed 68. If desired, headstock 26 can be located substantially in the center of lathe bed 68 in order to achieve maximum stability of the lathe while turning such large stock.

In the preferred embodiment, the head stock comprises a base 210 having a surface 218 which rests on the upper side of rails 208. In addition to resting on the upper side of rails 208, lower surface 218 of headstock base 210 also defines first and second mutually perpendicular slots 220 and 222 formed in the bottom of the base. In addition, in the preferred embodiment, lathe bed 68 comprises clamp key 69 which has a width which fits slidably between the sides of rails 208 and into the first and second slots 220 and 222, the clamp key further comprising protrusions 224 for engaging the underside of headstock rails 208 so that the headstock and, accordingly, the spindle shaft can be oriented in either of the two mutually perpendicular orientations anywhere along the length of lathe bed 68. In the preferred embodiment shown, clamp key 69 is secured under and between lathe bed rails 208 and into slots 220 or 222 through socket head screw 71, the shaft of which passes through clamp key 69 and is threaded into head stock base 210. Accordingly, by loosening socket head screw 71 so that clamp key 69 can be positioned in either of slots 220 or 222, the headstock 26 can be slidably positioned anywhere along the length of lathe bed 68 so that the spindle shaft 22 is oriented parallel to the longitudinal axis of the lathe bed as shown in FIGS. 6 and 8 or in an orientation perpendicular to the longitudinal axis of the lathe bed as is shown in FIGS. 7 and 9.

The present variable speed lathe preferably comprises a slidable, horizontally-rotatable headstock in which the headstock comprises a variable speed system including two variable speed pulleys formed by sheaves. The elements of such a lathe configuration have previously been described and will not be repeated here.

The present invention is to be limited only in accordance with the scope of the appended claims, since persons skilled in the art may devise other embodiments still within the limits of the claims.

What is claimed is:

1. A lathe comprising a slidable, horizontally-rotatable headstock, the lathe comprising:
   (a) a lathe bed having a length along a longitudinal axis, the lathe bed comprising rails oriented parallel to the longitudinal axis, the rails defining a horizontal plane, the lathe bed having a side in front of which a user normally stands; and
   (b) a headstock located on the lathe bed rails, the headstock comprising:
      (i) a spindle shaft having a stock turning end for providing rotational movement to stock to be turned on the lathe, the spindle shaft having a length along a central axis, the central axis of the spindle shaft being located a predetermined distance above the rails;
      (ii) adjustment means for selectively adjusting the orientation of the spindle shaft axis in at least two orientations including parallel to the longitudinal axis of the lathe bed or perpendicular to the longitudinal axis of the lathe bed, the spindle shaft axis in each orientation being parallel to the horizontal plane defined by the rails, the adjustment means further comprising means for slidably locating the headstock along the length of the lathe bed so that, when the headstock is oriented in the second orientation with the stock turning end of the spindle shaft turned toward the front side of the lathe bed, stock which is too large in diameter to be turned between the central axis of the spindle shaft and the rails can be turned on the front side of the lathe bed with the headstock located substantially in the center of the bed in order to achieve maximum stability of the lathe while turning;
      (iii) a base having a surface which rests on the rails;
      (iv) the surface which rests on the rails defining first and second mutually perpendicular slots formed in the bottom of the base; and
      (v) the lathe bed comprising a clamp key which fits between the rails and into the first and second slots, the clamp key comprising means for securing the headstock to the rails so that the spindle shaft can be oriented in either of the two mutually perpendicular orientations anywhere along the length of the lathe bed.

2. A variable speed lathe comprising a slidable, horizontally-rotatable headstock, the headstock comprising a variable speed system including two variable speed pulleys formed by sheaves, the lathe comprising:
   (a) a lathe bed having a length along a longitudinal axis, the lathe bed comprising rails oriented parallel to the longitudinal axis, the rails defining a horizontal plane, the lathe bed having a side in front of which a user normally stands;
   (b) a power system comprising a driving shaft, the driving shaft having a length along a central axis;
   (c) a spindle shaft having a length along a central axis;
   (d) support means associated with the headstock for operationally supporting the two shafts in positions substantially parallel to one another;
   (e) a V belt operationally connecting the two pulleys;
   (f) two fixed sheaves, one on each shaft, each fixed sheave comprising a conical face for forming one V belt bearing surface, the fixed sheaves further comprising means for securing the sheaves onto the driving or driven shaft so that the sheaves are prevented from both axial and rotational movement on the shafts, the means for securing each fixed sheave comprising a central aperture defined by a surface of the sheave, the central aperture having a diameter substantially corresponding to the diameter of the shaft so that the surface of the sheave which defines the central aperture is configured to be in direct contact with the shaft when the sheave is positioned on the shaft, the fixed sheave on the driving shaft and the fixed sheave on the driven shaft being positioned so that a tracking plane of the V belt is established to be substantially perpendicular to the axis of each shaft;
   (g) first and second movable sheaves, one on each shaft, each movable sheave comprising a conical face for forming one V belt bearing surface, the movable sheaves further comprising means for securing the sheaves onto the driving or driven shaft so that the sheaves may move freely in the axial direction while being prevented from rotational movement on the shaft, the means for securing each movable sheave comprising a central aperture defined by a surface of the sheave, the central aperture having a diameter substantially corresponding to the diameter of the shaft so that the surface of the sheave which defines the central aperture is configured to be in slidable direct contact with the shaft when the sheave is positioned on the shaft;
   (h) control means for controlling the position of each movable sheave;
   (i) a spindle shaft within the headstock, the spindle shaft having a stock turning end for providing rotational movement to stock to be turned on the lathe, the spindle shaft having a length along a central axis, the central axis of the spindle shaft being located a predetermined distance above the rails; and (j) headstock adjustment means for selectively adjusting the orientation of the spindle shaft axis in at least two orientations including parallel to the longitudinal axis of the lathe bed or perpendicular to the longitudinal axis of the lathe bed, the spindle shaft axis in each orientation being parallel to the horizontal plane defined by the rails, the adjustment means further comprising means for slidably locating the headstock along the length of the lathe bed so that, when the headstock is oriented in the second orientation with the stock turning end of the spindle shaft turned toward the front side of the lathe bed, stock which is too large in diameter to be turned between the central axis of the spindle shaft and the rails can be turned on the front side of the lathe bed with the headstock located substantially in the center of the bed in order to achieve maximum stability of the lathe while turning.

3. The variable speed lathe of claim 2 wherein each movable sheave comprises a sleeve bearing in the center of the sheave, the sleeve bearing having an internal diameter sized for a nominal slip fit directly onto the shaft.

4. The variable speed lathe of claim 2 wherein the conical face of each sheave extends substantially to the diameter of the central aperture.

5. The variable speed lathe of claim 2 wherein the driving shaft is a motor drive shaft.

6. The variable speed lathe of claim 2 wherein:
(a) the means for securing the fixed sheave comprises, for each fixed sheave:
  (i) a hub formed with the sheave, the hub further defining the central aperture; and
  (ii) a radially-oriented, threaded aperture defined by a surface of the hub and extending through the hub thickness of the sheave; and
  (iii) a set screw having a thread matching the thread of the radially-oriented, threaded aperture; and
(b) the means for securing the movable sheave comprises, for each movable sheave:
  (i) hub means for forming a hub with the sheave, the hub further defining the central aperture;
  (ii) a key compatible with a keyway in the shaft; and
  (iii) the surface of the movable sheave which defines the aperture further defines a keyway which has a cross sectional size configured for a slidable fit with the key.

7. The variable speed lathe of claim 2 wherein the control means comprises:
(a) first control means for controlling the position of the first movable sheave, the first control means comprising biasing means for biasing the movable sheave toward the fixed sheave; and
(b) second control means for controlling the position of the second movable sheave, the second control means comprising adjustment means controllable by a user for adjusting the position of the second movable sheave.

8. The variable speed lathe of claim 7 wherein the second control means comprises:
(a) hub means for forming a hub with the second movable sheave;
(b) a bearing having an inner race and an outer race, the inner race having a diameter sized for a press fit onto the hub of the second movable sheave, the inner race of the bearing being fitted onto the hub of the second movable sheave;
(c) a bearing cap comprising a central cavity defined by a surface of the cap, the central cavity having a diameter sized for a press fit onto the outer race of the bearing, the bearing cap being fitted onto the outer race of the bearing, the bearing cap further comprising means for engaging the adjustment means; and
(d) the adjustment means comprising a lever pivoted on the frame and engaged with the bearing cap, the adjustment means further comprising a rotatable adjustment handle for pivoting the lever and, accordingly, adjusting the axial position of the second movable sheave when the handle is rotated.

9. The variable speed lathe of claim 7 wherein the first control means is located on the driven shaft.

10. The variable speed lathe of claim 2 wherein:
(a) the headstock comprises a base having a surface which rests on the rails;
(b) the surface which rests on the rails defines first and second mutually perpendicular slots formed in the bottom of the base;
(c) the lathe bed comprises a clamp key which fits between the rails and into the first and second slots, the clamp key comprising means for securing the headstock to the rails so that the spindle shaft can be oriented in either of the two mutually perpendicular orientations anywhere along the length of the lathe bed.

* * * * *